United States Patent Office 2,858,816
Patented Nov. 4, 1958

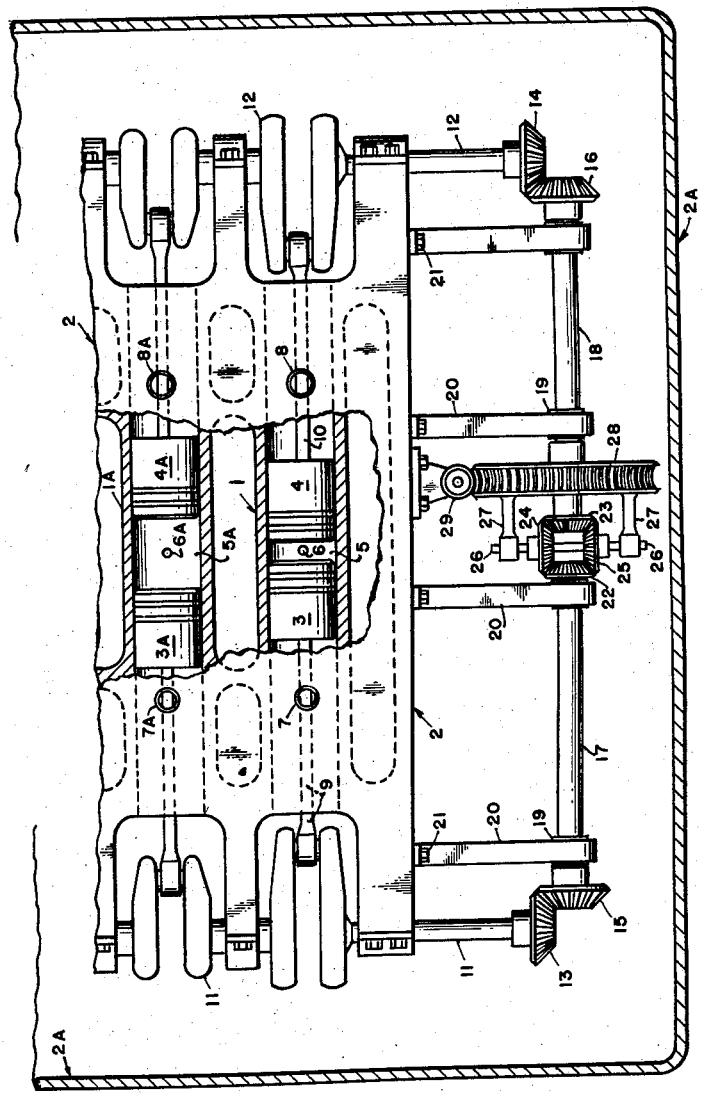
LEON A PRENTICE
INVENTOR.

2,858,816

INTERNAL COMBUSTION ENGINES OF THE VARIABLE COMPRESSION TYPE

Leon A. Prentice, Portland, Oreg.

Application October 8, 1957, Serial No. 688,911

3 Claims. (Cl. 123—48)

This invention relates to internal combustion engines of the variable compression type.

As is well known, the efficiency of an internal combustion engine is in direct relation to its compression ratio. Internal combustion engines of the full diesel type rely on compression heat for their ignition. In starting an engine of this last mentioned type the starting system is often overloaded by reason of the high compression ratio needed for ignition. The compression ratios of engines now in use are fixed and so is a compromise between the most efficient operating ratio and a ratio that permits the starting system to function. This invention applied to the other types of internal combustion engines renders them flexible in their fuel grade requirements, power output and economy.

Accordingly, it is one of the principal objects of the invention to provide an improved engine embodying novel means by which the compression ratio can be varied to facilitate starting and thereafter while the engine is in operation so as to render the engine readily adaptable for efficient performance under varying conditions of operation.

Another object of the invention is to provide an improved engine of the character described wherein the means for varying the compression ratio comprises a minimum number of additional parts and accomplishes the desired result in a positive and efficient manner without disturbing the timing or valve cycle of the engine.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

The figure in the drawing is a transverse sectional view taken through an engine made in accordance with my invention and showing one pair of pistons at the end of their inward or compression stroke and another pair of pistons on their power stroke.

With continuing reference to the drawing, reference numerals 1 and 1A indicate generally, in diagram, two cylinders within a water-jacketed engine block 2 disposed within a suitable crankcase 2A. Each cylinder is provided with a pair of opposed pistons 3 and 4 and 3A and 4A forming between each pair a common combustion and compression space 5 and 5A to which fuel is supplied by means including injection nozzles 6 and 6A and intake ports 7 and 7A by means of which air under pressure from a conventional blower (not shown) is supplied. Exhaust ports 8 and 8A are also in communication with their respective compression spaces and as shown in the drawing are located further from the injection nozzle than are the air intake ports for a purpose to be more fully hereinafter described. Since the operation of both sets of pistons is identical, the operation of only one will be described. During operation, compressed air for maintaining combustion is supplied to the cylinder 1 and controlled by movement of the piston 3. After combustion of the fuel supplied through the nozzle 6 burned gases are discharged through the exhaust port 8, the discharge being controlled by the piston 4.

The pistons 3 and 4 are connected by rods 9 and 10 respectively to separate crankshafts 11 and 12 respectively. The compression ratio thus depends on the phase relation between the pistons 3 and 4, maximum compression ratio being obtained when the pistons are in synchronism, that is, reach simultaneously their top dead-center positions. In order to vary or to maintain certain phase relationships between the pistons, means are provided for interconnecting the crankshafts 11 and 12. This I accomplish by providing the inner ends of the crankshafts 11 and 12 with bevel gears 13 and 14, respectively, enmeshed at all times respectively with companion gears 15 and 16 secured respectively to the outer ends of shafts 17 and 18. These shafts are journalled as at 19 in brackets 20 secured in any approved manner as at 21 to the engine block 2.

The inner ends of shafts 17 and 18 are provided with bevel bears 22 and 23 respectively, meshing with companion gears 24 and 25 independently rotatable on a shaft 26 and thus constituting what will be hereinafter referred to as the "differential unit." The shaft 26 is secured to a yoke in the form of a pair of arms 27 extending laterally from a worm gear 28 rotatable about the shaft 18 and meshing with a worm 29 and thereby adapted to be rotated relative to shaft 18 independently thereof.

During starting when the engine is cold and also at low engine speed a high compression ratio is necessary to assure ignition. At high engine speed and high load output it is desirable to increase the compression ratio in the interest of greater efficiency and economy. When an engine of this type is started by using ordinary cranking methods and a high compression ratio, it imposes a heavy load on the starting equipment, and when this equipment is of the type employing storage batteries, the results are frequently unsatisfactory, especially in cold weather.

In starting the engine of my invention I obviate the foregoing difficulties by varying the angular relation between the crankshafts 11 and 12 to effect a low compression ratio and thereby minimize the initial cranking load and then as cranking momentum builds up gradually increase the compression ratio commensurate therewith to its peak for ignition purposes. This is accomplished by rotation of the worm gear 28 in one direction through manipulation of the worm 29.

In the position shown, both pistons 3 and 4 are at their top dead-center positions. If piston 3 is now moved to the left by manipulation of worm 29 it will return to its dead-center position later. On the other hand, if piston 4 is moved to the right, that is, away from its dead-center position, it will return to such dead-center position later. Hence, if one piston reaches the dead-center position earlier and the other one later, the phase angle between them must increase and the compression or the compression ratio consequently must decrease.

Rotation of worm gear 28 in an opposite direction likewise causes a change of compression ratio except that in this case piston 3 is accelerated and piston 4 is retarded, causing an opposite phase displacement. In other words, piston 4 will arrive at dead-center later and piston 3 earlier. According to my invention, the adjustment is made in one side of the condition for which the pistons arrive simultaneously at their dead-center. If the pistons do not arrive simultaneously the compression ratio is reduced regardless of which piston arrives at dead-center first. If the pistons are dephased to reduce the compression ratio the dephasing is preferably in the direction to advance the relative phase of the piston 4 uncovering the exhaust port. This permits the cylinder to scavenge before the intake port is opened.

From the foregoing it will be apparent that by mere manipulation of the worm 29 any desired variation in compression ratio can be obtained while the engine is in operation so as to facilitate starting and also to improve its operating efficiency.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. In an internal combustion engine the combination with a cylinder having fuel supply and exhaust ports, two opposed pistons disposed within the cylinder and forming a common compression space therewith, means for supplying fuel to the compression space, separate drive shafts connected to the pistons, two axially aligned shafts geared at one of their ends to said drive shafts and terminating at their opposite ends in gear components of a bevel-gear train to maintain certain angular relations between the drive shafts and manipulatory means associated with said aligned shafts and operable independent of engine operation for controlling the bevel-gear train to vary the angular relation between the drive shafts and hence the compression ratio between said pistons.

2. In an internal combustion engine the combination with a cylinder having fuel supply and exhaust ports, two opposed pistons disposed within the cylinder and forming a common compression space therewith, means for supplying fuel to the compression space, separate drive shafts connected to the piston, two axially aligned shafts geared at one of their ends to said drive shafts and terminating at their opposite ends in certain gear components of a bevel-gear train to maintain certain angular relations between the drive shafts and manipulatory means independent of engine operation for controlling other gear components of said bevel-gear train to vary the angular relation between the drive shafts and hence the compression ratio between said pistons.

3. In an internal combustion engine the combination with at least one cylinder horizontally disposed within a crankcase and having fuel supply and exhaust ports, two opposed pistons disposed within the cylinder and forming a common combustion space therewith, means for supplying fuel to the compression space, separate drive shafts arranged perpendicular to said cylinder at both ends thereof and connected to said pistons, two axially aligned shafts arranged parallel with said cylinder and geared at one of their ends to said drive shafts and terminating at their opposite ends in two gears of a differential unit meshing with two other gears thereof, said two other gears being carried by a worm gear rotatable about one of said axially aligned shafts, and a worm enmeshed with said worm gear for rotating said two other gears relative to the first mentioned two gears of the differential unit for selectively changing the phase angle between said pistons.

References Cited in the file of this patent

UNITED STATES PATENTS

| | | |
|---|---|---|
| 2,292,104 | Davids | Aug. 4, 1942 |
| 2,401,188 | Prince | May 28, 1946 |

FOREIGN PATENTS

| | | |
|---|---|---|
| 616,451 | Germany | July 25, 1935 |
| 725,059 | Germany | Sept. 12, 1942 |